United States Patent [19]

Pippert

[11] Patent Number: 4,700,503
[45] Date of Patent: * Oct. 20, 1987

[54] FISHING LURE

[75] Inventor: Aaron J. Pippert, Houston, Tex.

[73] Assignee: Utex Industries, Inc., Houston, Tex.

[*] Notice: The portion of the term of this patent subsequent to Mar. 4, 2003 has been disclaimed.

[21] Appl. No.: 801,551

[22] Filed: Nov. 25, 1985

Related U.S. Application Data

[63] Continuation-in-part of Ser. No. 462,057, Jan. 28, 1983, Pat. No. 4,573,283, which is a continuation-in-part of Ser. No. 186,411, Sep. 12, 1980, abandoned.

[30] Foreign Application Priority Data

May 22, 1985 [CA] Canada ................................... 482042

[51] Int. Cl.⁴ .............................................. A01K 85/00
[52] U.S. Cl. ...................................... 43/42.09; 43/42.5
[58] Field of Search ................. 43/42.09, 42.22, 42.24, 43/42.38, 42.49, 42.5

[56] References Cited

U.S. PATENT DOCUMENTS 3,289,345 12/1966 Reininger ............................ 43/42.09
3,490,165 1/1970 Thomassin ......................... 43/42.09

FOREIGN PATENT DOCUMENTS 179909 8/1962 Sweden ................................ 43/42.5

Primary Examiner—Kurt Rowan
Attorney, Agent, or Firm—Browning, Bushman, Zamecki & Anderson

[57] ABSTRACT

A fishing lure comprises a lure body having outer surfaces defining the general overall exterior size and configuration of the lure as a whole. The outer surfaces include an upper surface and a lower surface. The lure body has a cavity extending therethrough in a generally horizontal direction corresponding to the length of the cavity, the cavity having width extending transverse to the length and generally horizontally, and depth extending transverse to the length and generally vertically. The width is greater than the depth over a major portion of the length of the cavity, and the configuration of the cavity is dissimilar to the overall external configuration of the lure body. The lure body has an insert opening through the exterior thereof into one end of the cavity. The lure further comprises an insert slidably mounted in the cavity but selectively removable from the cavity through the insert opening. The insert has length, width, and thickness generally parallel to the corresponding dimensions of the cavity, the width of the insert being greater than its thickness over a major portion of its length.

17 Claims, 13 Drawing Figures

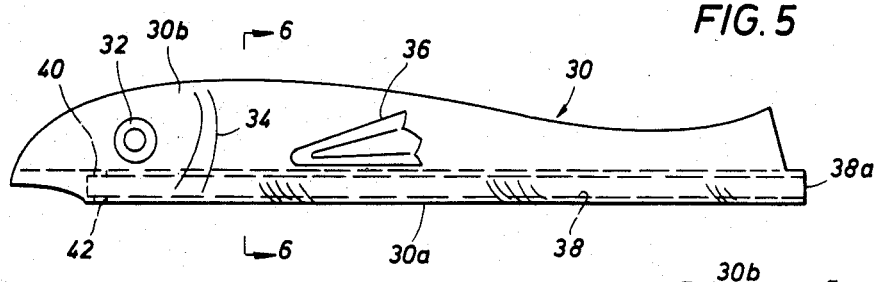
FIG. 5
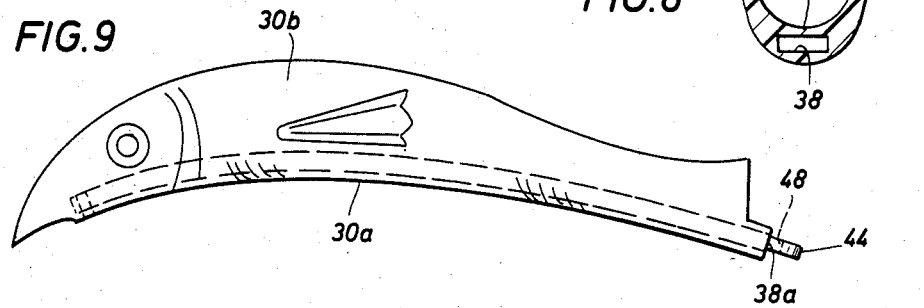
FIG. 6
FIG. 9
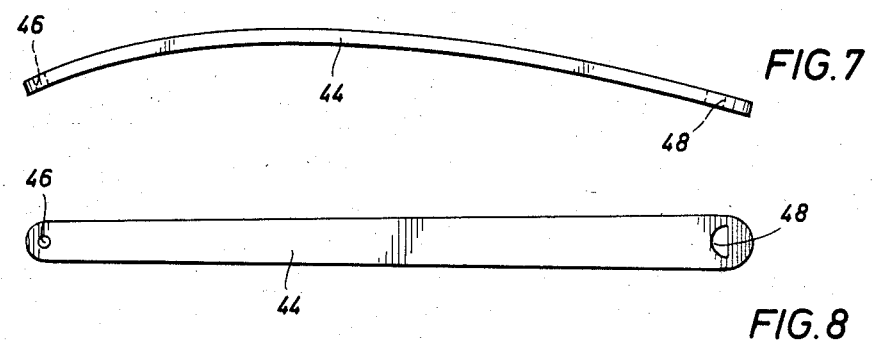
FIG. 7
FIG. 8
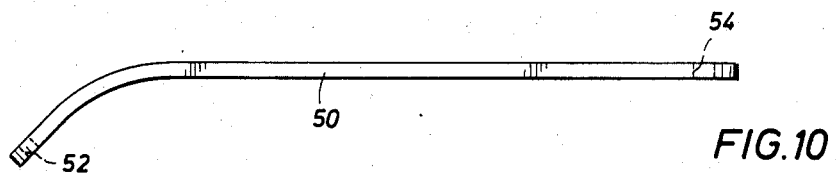
FIG. 10
FIG. 11

4,700,503

FISHING LURE

CROSS REFERENCE TO RELATED APPLICATION

This is a continuation-in-part of application Ser. No. 462,057, filed Jan. 28, 1983, now U.S. Pat. No. 4,573,283, which in turn is a continuation-in-part of application Ser. No. 186,411 filed Sept. 12, 1980, now abandoned.

BACKGROUND OF THE INVENTION

1. Field of the Invention

The present invention pertains to fishing lures. In the past, most lures have been made either of metal or of a rubber-like or plastic material. Rubber-like and/or plastic materials are preferred by many fisherman because of the versatility they offer in providing many different types of lures and lures which more nearly resemble the natural prey of various fish. For example, the formation of lures from plastic materials not only permits the use of many different colors for various lures, but also permits the production of individual lures having different colors on different parts thereof. These effects can be achieved either by properly coloring the plastic material from which the lure is to be formed and/or by painting the exterior of the lure body, but would be more difficult if the lure body were comprised of metal. Furthermore, because molded plastic bodies having intricate configurations can be produced much more cheaply than like bodies of metal, it becomes practicable, with the use of plastics, to form lure bodies whose external configurations fairly accurately represent those of a small fish, worm, shrimp, or other natural prey. By way of comparison, metal lures are more typically produced in fairly simple shapes, such as that commonly known as a "spoon." Likewise, the use of various plastics permits different lure bodies to be formed with varying degrees of other qualities such as translucence, fluorescence, etc.

Although plastic lures have numerous advantages described above, they also have several drawbacks. One of these is that they are often too light in weight to provide the desired action as they are played in the water. Another is that, with the fish hook attached to one end or side of the lure body and the line attached to the other, the lure body may break or tear away in use due to the relative weakness of the material of which it is formed. This is particularly true of the relatively soft or flexible plastics or other rubber-like materials commonly used in the manufacture of shrimp or worm type lures. For these reasons, many fishermen continue to use metal lures for the sake of their greater weight and strength.

Still another disadvantage with any conventional lure, regardless of the material of which it is formed, is that its weight and configuration are fixed. Accordingly, a fisherman wishing to have the capability of varying the lure weight, appearance or action must carry a relatively large assortment of separate lures. Additionally, since each of these lures has one or more hooks, they tend to become entangled. Furthermore, as previously mentioned, the plastic lures may be relatively light and are therefore limited to relatively large sizes, since a relatively small lure formed entirely of plastic would be unduly light in weight. Conversely, with many of the preferred metal materials, the lure body may be limited to a relatively small range of sizes, since larger lures formed of such metals normally would be entirely too heavy.

2. Description of the Prior Art

Various schemes have been devised for dealing with the above problems. However, in general, these have dealt with only one or another of the aforementioned disadvantages, and have failed to address others, and/or have introduced new problems of their own. For example, U.S. Pat. No. 2,708,806 to Siebert, U.S. Pat. No. 2,787,075 to Baum and U.S. Pat. No. 3,395,480 to McPherson disclose lures having upper and lower ayers formed of different materials. Such lures attempt to combine various qualities of metal and plastic, such materials being used in the different layers respectively. However, the means by which these layers are joined to each other render these lures relatively expensive. Furthermore, the weight, appearance, and action of each such lure are still fixed or unchangeable.

U.S. Pat. No. 3,305,964 to Wieszeck discloses a plastic lure body having metal members embedded therein. While such a structure may have increased weight and/or strength, as compared with lures formed of plastic only, it is likewise relatively expensive to manufacture, and its features are fixed.

U.S. Pat. No. 3,289,345 to Reininger et al discloses a sleeve which can emplaced over a conventional spoon type lure to compensate for wearing of the finish on the exterior of the lure and/or to change it, color. However, in this structure, the sleeve is a relatively thin-walled cover which simply parallels the general external configuration of an already existing lure body. Thus, such configuration, as well as the weight of the lure, are pre-determined and generally fixed by such existing lure.

French Patent No. 1,509,103 to Masson, U.S. Pat. No. 3,108,390 to Knight, U.S. Pat. No. 4,266,360 to Smith, U.S. Pat. No. 3,490,165, to Thomassin, U.S. Pat. No. 3,971,152, to Husson, Jr., U.S. Pat. No. 3,203,132 to Kotis, U.S. Pat. No. 4,307,531 to House, and U.S. Pat. No. 4,211,027 to Viscardi all disclosed multi-part lures. However, none of these arrangements achieve the salient results of the present invention. Most of them are far too complicated to be really practical. Many utilize inserts oriented with their maximum transverse dimension extending in what should be a vertical direction. Such orientation may tend to make the lure lie sideways in the water, especially if the insert is designated to add weight and support to the lure body.

SUMMARY OF THE INVENTION

The present invention comprises a fishing lure including a lure body having outer surfaces defining the general overall exterior size and configuration of the lure. These outer surfaces include an upper surface and a lower surface. The lure body has a cavity extending therethrough in a generally horizontal direction corresponding to the length of said cavity, with the width of the cavity extending transverse to the length and generally horizontally, and the depth of the cavity extending transverse to the length and generally vertically. The width of the cavity is greater than the depth over a major portion of the length of the cavity. The configuration of the cavity is dissimilar to the overall external configuration of the lure body and lure as a whole. The body further has an insert opening through the exterior thereof into one end of the cavity. The lure further includes an insert slidably mounted in the cavity but selectively removable from the cavity through the insert opening. The insert has length, width and thickness generally parallel to the length, width, and depth, respectively, of the cavity. As with the cavity, the width of the mating insert is greater than the thickness over a major portion of the length of the insert.

In preferred embodiments of the invention, the length of the cavity extends generally through the major lengthwise dimension of the lure body, and the insert is configured for a mating fit in the cavity.

The lure of the present invention thus provides a simple, economical, yet highly effective way of optimizing the various characteristics, such as color, size-to-weight ratio, etc., desired in a lure, while also providing a high degree of versatility. For example, many different effects can be achieved by using different inserts with a given lure body and/or different lure bodies with a given insert.

The fact that the width of the cavity and mating insert is greater than the thickness permits the insert to add the necessary weight, e.g. to a light plastic or rubber-like lure body, for casting and desired action in the water, and to better support the lure body, particularly if the latter is flexible. Not only does this form of insert not adversely affect the proper orientation of the lure in the water, but on the contrary, tends to prevent the upper and lower surfaces of the lure body from turning sideways in the water.

Where the length of the cavity and its insert extend generally through the major lengthwise dimension of the lure body, the ability of the insert to support and ballast the lure body and control its action in the water, is maximized. The insert preferably comprises a means defining an eyelet generally adjacent its leading end and means—preferably another eyelet—for carrying at least one fish hook adjacent its trailing end. Thus, because the line may be attached to the eyelet on the insert, and the fish hook is also carried by the insert, forces exerted on the lure in use are borne primarily by the insert, rather than by the lure body. The insert, or at least the portion thereof carrying the hook and line, is, as mentioned, preferably formed of a relatively strong material such as metal. Thus, there is little chance of the lure body tearing away in use, even though it may be formed of a relatively soft and flexible material.

To enhance the ease of attaching the line and/or other tackle to the lure, the thickness of the insert is preferably reduced at its leading and trailing ends, more specifically, tapered, decreasing outwardly.

If the lure body is flexible, different inserts can be used to modify or "fine tune" its configuration and action in water. Even if one such insert basically parallels the unflexed configuration of the cavity, that insert—being sufficiently rigid to resist deformation in normal use—will support the relatively flexible lure body in a desired, e.g. straight line, configuration. This can also help to restore a desired configuration to a lure body which has become deformed by crushing between other objects in the tackle box, heat, etc.

In addition to a complete lure, the present invention comprises the subcombinations of individual lure bodies and inserts of the type generally described and claimed herein.

Accordingly, it is a principal object of the present invention to provide an improved fishing lure.

Another object of the present invention is to provide an improved lure body having a cavity, dissimilar from the external configuration and wider than it is deep, for receipt of an insert.

Another object of the present invention is to provide an improved insert for such a lure body, having its thickness reduced at its leading and trailing ends.

Still other objects, features, and advantages of the present invention will be made apparent by the following detailed description, the drawings, and the claims.

BRIEF DESCRIPTION OF THE DRAWINGS

FIG. 5 is a side elevational view of a lure body according to a second embodiment of the invention.

FIG. 6 is a transverse cross-sectional view taken along the line 6—6 in FIG. 5.

FIG. 7 is a side elevational view of a first insert for use with the lure body of FIGS. 5 and 6.

FIG. 8 is a plan view of the insert of FIG. 7.

FIG. 9 is a side elevational view of the lure body of FIGS. 5 and 6 with the insert of FIGS. 7 and 8 therein.

FIGS. 10 and 11 are side elevational views of alternate inserts for use with the lure body of FIGS. 5 and 6.

DESCRIPTION OF THE PREFERRED EMBODIMENTS

Figure 1:
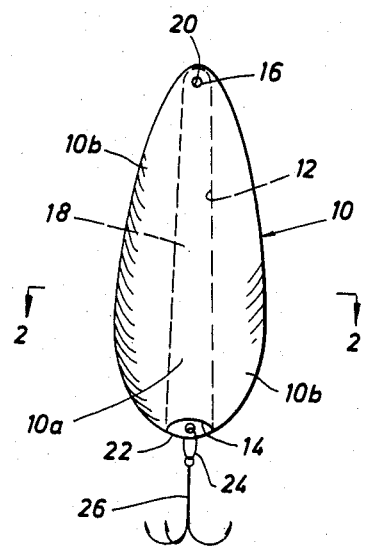
FIG. 1 is a plan view of a first embodiment of lure according to the present invention.
Figure 2:
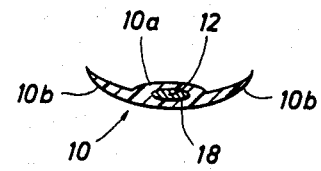
FIG. 2 is a transverse cross-sectional view taken along the line 2—2 in FIG. 1.
Figure 3:
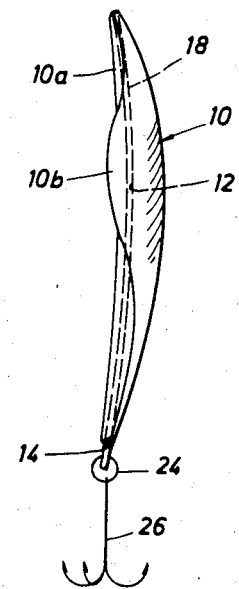
FIG. 3 is a side elevational view taken along the line 3—3 in FIG. 1.

Referring now to FIGS. 1-3, there is shown a first embodiment of the present invention. The lure of FIGS. 1-3 includes a lure body 10 molded of a relatively flexible or rubber-like resin or plastic. The outer surfaces of body 10 define the overall external size and general configurational type of the lure as a whole. In the embodiment shown, the configuration type thus defined by body 10 is generally that of a modified spoon.

The outer surfaces of body 10 include upper and lower surfaces 11 and 13. The terms "upper" and "lower" are used in a somewhat general sense herein, primarily as a reference for defining the length, width, and thickness of certain parts of the lure. To one of skill in the art, any more or less conventional form of lure body will have readily identifiable upper and lower surfaces. In the case of a spoon type lure, as shown in FIGS. 1-4, and particularly a flexible one whose configuration can be somewhat altered depending upon the form of insert used, the lure body may be reversible, so that in use, the surface 11 will sometimes serve as the upper surface, and the surface 13 will serve as the upper surface at other times. Also, it can readily be appreciated that the lure will move about and change its orientation somewhat in the water. Nevertheless, as understood by those of skill in the art, when played in the water, the lure will, most of the time, be oriented such that one of the surfaces 11 or 13 is facing generally upwardly and the other generally downwardly, as opposed to laterally, and thus they will be considered upper and lower surfaces for purposes of this discussion.

More specifically, when viewed in plan as in FIG. 1, such configuration includes a generally ovoid profile. As best seen in FIG. 2, the external configuration of body 10 further includes a thickened central rib portion 10a extending along the length of body 10 and a pair of flap-like appendages 10b extending lengthwise along opposite sides of rib portion 10a. Appendages 10b are directed laterally outwardly from rib 10a in opposite directions. Also as shown in FIG. 2, the surfaces defining appendages 10b are concave along the upper surface 11 of body 10, and convex and continuous with the adjoining surface of rib portion 10a along the lower surface 13 of body 10.

Body 10 further includes inner surfaces defining a cavity 12 extending generally lengthwise through body 10. Cavity 12 is substantially smaller than the external size of body 10 and of substantially different configuration than the external configuration of body 10, i.e. it is not similar in the geometric sense. More specifically, cavity 12 has a simple elliptical transverse cross-sectional configuration and is substantially straight in the lengthwise direction (in a relaxed condition without insert 18 therein), i.e. when viewed in longitudinal cross section, the cavity walls are straight as indicated by the phantom lines in FIG. 1. The width of cavity 12, as shown in FIG. 1, extends transverse to the cavity length and generally horizontally, and is smoothly tapered or graduated along the length of cavity 12, increasing rearwardly. As shown in FIG. 3, the depth or thickness of cavity 12 extends transverse to the length and generally vertically and is generally uniform. At virtually any point along its length, the width of cavity 12 is substantially greater than the depth.

The wide end of cavity 12 is the trailing end thereof, and the narrow end is its leading end. Since cavity 12 extends lengthwise through body 10, the leading and trailing ends of the cavity 12 correspond respectively to the front and rear ends of body 10. Body 10 has an insert opening 14 extending from its exterior endwise into the trailing end of cavity 12. Body 10 also has a pair of aligned access openings 16 extending transversely into the leading end of cavity 12.

The lure also includes an insert 18 formed of a relatively strong rigid metal. The insert 18 is removably mounted in cavity 12 by inserting it through insert opening 14. The length of insert 18 corresponds generally to that of cavity 12 as does its elliptical transverse cross-sectional configuration. The width and thickness of insert 18 are substantially equal to, but slightly smaller than, the corresponding dimensions of cavity 12 (the width of insert 18 being tapered from one end to the other to correspond to the taper of the cavity) so as to permit insertion of insert 18 into cavity 12 while still providing a relatively snug mating fit. However, while cavity 12, in a relaxed condition with insert 18 removed therefrom, would either be straight or limp when viewed from the side, insert 18 is slightly concave upwardly. Henceforth herein a cavity will be considered "straight" whether the lure body is sufficiently rigid to maintain a straight cavity configuration (in the absence of an insert) or if, while technically formed straight, it falls limp under its own weight.

Thus, when insert 18 is inserted into cavity 12, body 10 will flex in the direction from leading to trailing end to allow cavity 12 to follow the curvature of insert 18. More specifically, not only is there deflection of central portion 10a but also flexing of appendages 10b (see FIG. 3). Accordingly, while body 10 may be easily molded with relatively simple apparatus, including a straight mold piece for defining cavity 12, a fairly sophisticated configuration is ultimately achieved through the use of insert 18.

Insert 18 has a relatively narrow leading end received in the leading end of cavity 12. A line eyelet 20 through said leading end of insert 18 is positioned for alignment with access openings 16 so that the fishing line, or a swivel attachment therefor, can be passed through openings 16 and eyelet 20 for securing the lure to the line. Insert 18 also has an aperture or hook eyelet 22 through its wide or trailing end for carrying a fishhook 26 via a small link ring 24 interconnecting hook 26 and aperture 22. As shown in FIG. 1, body 10 is cut away adjacent insert opening 14 to expose the rearmost portion of insert 18 in which aperture 22 is formed. This facilitates changing of hook 26 without disassembly of the lure.

Due to its relatively greater density, metal insert 18 adds desired weight to the plastic body 10 in which it is mounted while also adding support to the relatively flexible lure body along its central rib portion 10a. Furthermore, since the line and hook are engaged with insert 18, the major portion of the forces exerted on the lure in use are borne by the relatively strong insert 18, rather than by the relatively soft flexible body 10. Thus, there is little chance of body 10 tearing away in use. The snug fit of insert 18 in cavity 12, together with the mating tapers of insert 18 and cavity 12 laterally outwardly from their leading to their trailing ends, keeps the two members properly assembled as the lure is pulled through the water by its leading end. The two members, i.e. body 10 and insert 18, are further secured together by the line when it is passed through openings 16 and eyelet 20. Also, because the width of insert 18 is substantially greater than its thickness, the lure will naturally tend to remain properly oriented in the water, i.e. with surfaces 11 and 13 facing generally upwardly and downwardly.

Figure 4:
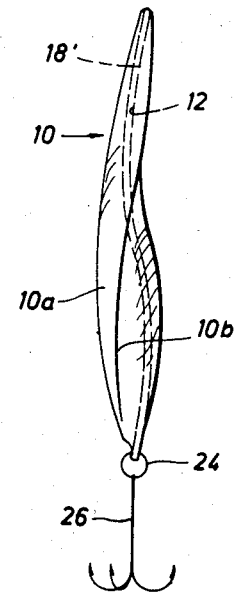
FIG. 4 is a view similar to that of FIG. 3 showing the lure body of FIGS. 1-3 with a different shaped insert.

Should the user desire to change the weight of the lure as a whole, this can be done by removing insert 18 from cavity 12 and replacing it with a similar insert having the same configuration but formed of lighter or heavier material(s) as needed. Due to the flexibility of body 10, interchangeable inserts can likewise be used to effect variations in the external configuration of the lure body. As previously mentioned, insert 18 is slightly concave upwardly. FIG. 4 shows a similar insert 18' having dimensions along its length, width, and thickness, substantially equal to those of insert 18, but differing in configuration in that it has a sigmoid curvature when viewed from the side. FIG. 4 illustrates the manner in which body 10 would flex to accommodate such curvature when insert 18' is inserted in cavity 12 and the difference in external appearance which would be obtained thereby. Such change of external configuration will also change the action of the lure in the water. The external appearance could further be altered by inverting insert 18 or 18' with respect to body 10, or by replacing body 10 with a similar body having a cavity sized to mate with insert 18 or 18' but differing in external appearance from body 10, e.g. in color or general external profile.

FIGS. 5–9 illustrate a second embodiment of the invention. FIGS. 5 and 6 show the flexible lure body 30 which includes a central portion 30a extending lengthwise along the major dimension of the lure body and a pair of flap-like appendages 30b extending lengthwise along opposite sides of central portion 30a and integral therewith. As best seen in FIG. 6, appendages 30b are directed generally tangentially with respect to central portion 30a (as compared to the laterally directed appendages 10b of the first embodiment) and in the same general direction, i.e. upwardly as viewed in the drawings. Although appendages 30b are generally parallel to each other, they may be flared slightly away from each other as shown in FIG. 6. When viewed from the side, as in FIG. 5, the appendages 30b, together with the adjacent central portion 30a, define the general configuration simulating a small fish. This simulation can be enhanced with features such as eyes 32, gills 34 and fins 36 molded into and/or painted on the outer sides of the lure body. Lure body 30 has upper surface 31 and lower surface 33.

Lure body 30 has a cavity 38 extending lengthwise through central portion 30a. Cavity 38 has a fairly simple geometry, being straight in the lengthwise direction and having a generally rectangular cross-sectional configuration. The depth of recess 38 (measured in the vertical direction as shown in the drawings) is substantially uniform, while the width of the recess, greater than the depth at virtually every point along the length, has a slight taper, similar to that of the preceding embodiment, the narrower end of the recess being forwardmost. Near the forward end of recess 38, central portion 30a has aligned bores 40 and 42 serving as access openings communicating with cavity 38 from above and below. The rear end of recess 38 opens through the lure body to provide an insert opening 38a.

FIGS. 7 and 8 show one metal insert 44 adapted for use with the lure body of FIGS. 5 and 6. It can be seen that the major lengthwise dimension of the lure body 30 corresponds to the direction from the leading to the trailing end of cavity 38. Insert 44 is similarly elongated and sized and shaped for receipt in cavity 38. More specifically, as shown in FIG. 7, insert 44 is of substantially uniform thickness, while as seen in FIG. 8, the width of insert 44 is tapered from a narrow leading end to a slightly wider trailing end. The width is greater than the thickness at virtually every point along the length, i.e. except at the extreme leading and trailing ends. Insert 44 is not, however, straight in its lengthwise direction, as is cavity 38 in a relaxed condition, but rather is curved so as to be concave downwardly, as shown in FIG. 7.

Insert 44 is formed of a metal which is more rigid than the material of lure body 30 so that, when insert 44 is inserted in cavity 38, the lure body will be deflected as shown in FIG. 9. This not only causes the fairly simple molded body 30 to assume a more sophisticated configuration, but also determines the action of the lure in the water.

With the insert in place, a bore or line eyelet 46 in the leading end of insert 44 is aligned with bores 40 and 42 in the lure body to permit attachment of a fishing line to the lure. The trailing end of insert 44 has a bore or hook eyelet 48 therethrough, and when the insert is in place as shown in FIG. 9, the trailing end of the insert protrudes through insert opening 38a to at least partially expose bore 48. Bore 48 is used for attachment of one or more fish hooks to the insert and may also be used to grip the insert for removal. As in the preceding embodiment, with the fishing line and fish hook or hooks being attached to opposite ends of the insert 44, the forces on the lure in use are borne primarily by the metal insert 44, whereby the softer lure body 30 is protected from tearing or similar damage.

FIGS. 10 and 11 show additional inserts which can be used with lure body 30 in place of insert 44. Each of these inserts will cause the lure body to be deflected in the direction from the leading to the trailing end in a different manner from that shown in FIG. 9, thereby altering the configuration of the lure body. In the insert 50 shown in FIG. 10, the leading end is curved downwardly, with the trailing end being substantially straight. Bores 52 and 54 are provided through the leading and trailing ends respectively for attachment of the fishing line and fish hook. The insert 56 shown in FIG. 11 has a straight leading end with its trailing end deflected angularly downwardly. Again, bores 58 and 60 are provided for attachment of the fishing line and fish hook respectively.

For most fishermen, it is preferable that the various inserts for use with any given lure body be pre-formed to the appropriate configuration for determining a given type action of the lure in the water. However, some users prefer to be able to adjust the nature and degree of deflection on their own. For this purpose, one or more of the inserts can be made of a metal which, while significantly more rigid than the material of the lure body, is forcibly manually malleable, either before or after insertion into the lure body. Various steels and steel alloys are suitable.

Figure 12:
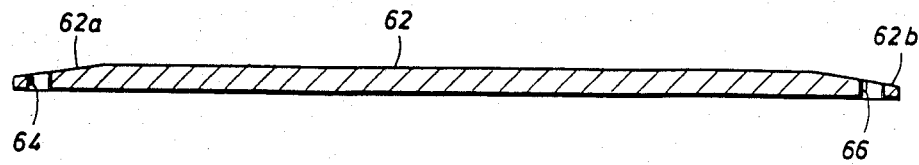
FIG. 12 is a side elevational view of a further improved insert for use with the body of FIGS. 5 and 6 or with the body of FIG. 13.

In some instances, it may be desired to allow the lure body of FIG. 5 to remain in a generally straight configuration (or to support it in such straight configuration if it is too flexible to be self-supporting), while still providing the other numerous advantages of the use of an insert according to the present invention, e.g. enhanced weight, support, attachment points for hook and line, and more reliable orientation in the water. In such instances, an insert of the type shown at 60 in FIG. 12 may be used. Insert 62 is much the same as the inserts of FIGS. 7-11, in that its length, width, and depth are sized to mate slidably with cavity 38. However, whereas the inserts of FIGS. 7-11 are curved or bent in various ways to flex the lure body 30, the insert 62, when viewed in longitudinal cross section as shown in FIG. 12, is straight, corresponding to the unflexed configuration of cavity 38. The only variation from this generally straight line configuration is adjacent the leading and trailing ends of insert 62 where its thickness is tapered, decreasing outwardly, as shown at 62a and 62b. The line eyelet 64 and hook eyelet 66 are located in the tapered areas 62a and 62b, respectively. The tapering, to reduce the thickness of the insert adjacent its leading and trailing ends, facilitates attachment of the lure relative to the line and/or the hook, e.g. with snap rings known in the art.

Figure 13:
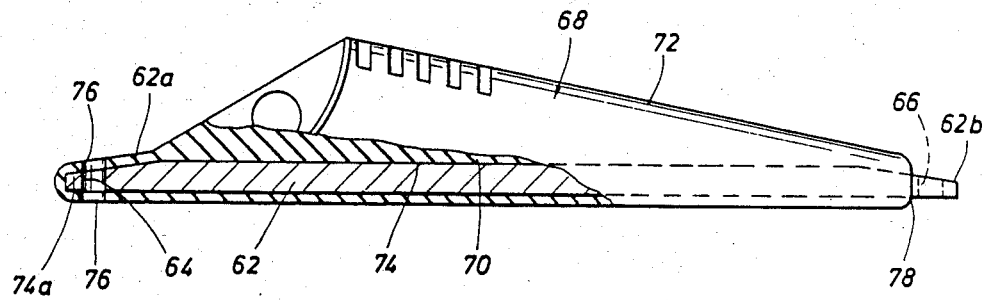
FIG. 13 is a side elevational view of the insert of FIG. 12 in a plug type body.

FIG. 13 shows insert 62 installed in a lure body 68, of a type similar to body 30, and often referred to as a "plug" type lure body. Briefly, the lure body has a central portion 70 in which its longitudinal cavity 74 is formed, and appendages, 72, extending generally upwardly and outwardly from opposite lateral sides of the central portion 70. FIG. 13 shows the manner in which insert 62 matches the original generally straight lengthwise configuration of cavity 74, and it can be appreciated that insert 62 would have a similar affect on body 30, as shown in FIG. 5.

In order to allow access to the eyelets 64 and 66, and to do so in such a way as not to interfere with the aforementioned advantage of the reduced thickness in insert areas 62a and 62b, the lure body 68, the cavity 74 has its depth similarly tapered at 74 the adjacent walls of the lure body are thin, correspondingly tapered, and provided with access openings 76. The trailing end of insert 62 protrudes from the insert opening 78 of body 68. In other embodiments, the leading end of the insert could similarly protrude from the front of the lure body.

In any of the preceding embodiments, lure bodies can be formed of any number of resinous or plastic materials. Examples include vinyls, acrylics, polyurethanes, thermoplastic elastomers, nylon, and various synthetic as well as natural rubbers. The choice of material for the lure body will depend upon the precise characteristics desired. In some instances, wherein it is not desired to use the insert to alter the unflexed configuration of the lure body, self-supporting rigid or semi-rigid resinous or plastic materials can be employed, and the cavity would have a configuration to mate with that of the insert. While the inserts are conveniently made of suitable metals, any rigid material, having an appropriate density relative to that of the material of which the lure bodies are formed, and other desirable characteristics, such as resistance to rusting, corrosion, etc., can be employed for the inserts.

Lures according to the present invention can advantageously be provided in kits each including a plurality of interchangeable inserts and/or a number of lure bodies.

Numerous modifications of the exemplary embodiments shown above are possible. For example, some inserts might be provided with means for attaching the fishing line at slightly different distances from the extreme leading end. More specifically, an insert could be provided with one or more bores such as shown at 46, spaced lengthwise along the leading end of the insert and/or a plurality of raised loop type eyelets extending upwardly from the upper surface of the insert and likewise spaced along its leading end. In any event, it will be understood that the corresponding lure body would be provided with suitable openings or cutaway areas to allow access to any of the eyelets desired. Attachment of a fishing line at slightly different points, as thus permitted, provides a further means of altering the action of the lure in the water.

By way of a further example, in the embodiments shown above, the widths of the various cavities and inserts are greater than their depths or thicknesses at virtually any point along their lengths. However, in other embodiments, it may be possible to employ a cavity and/or insert in which such relationship exists only over some major portion of the length, the width and thickness being, for example, equal over a relatively minor portion of the length, e.g. at one end.

Numerous other changes in the precise configurations of the lure bodies and inserts could be made within the spirit of the invention. Accordingly, it is intended that the scope of the invention be limited only by the claims which follow.

What is claimed is:

1. A fishing lure comprising:
   a lure body having outer surfaces defining the general overall exterior size and configuration of said lure, said outer surfaces including an upper surface and a lower surface, said lure body having a cavity extending therethrough in a generally horizontal direction corresponding to the length of said lure body, said cavity having width extending transverse to the length and generally horizontally, and depth extending transverse to the length and generally vertically, the width of said cavity being greater than the depth over a major portion of the length of said cavity, the configuration of said cavity being dissimilar to said overall external configuration, and said body having an insert opening through the exterior thereof into one end of said cavity; and
   an insert slidably mounted in said cavity but selectively removable from said cavity through said insert opening, said insert having length, width, and thickness generally parallel to the length, width, and depth, respectively, of said cavity, the width of said insert being greater than the thickness over a major portion of the length of said insert.

2. The lure of claim 1 wherein the length of said cavity extends generally through the major lengthwise dimension of said lure body.

3. The lure body of claim 1 wherein said insert is sized for a mating fit in said cavity.

4. The lure of claim 2 wherein said cavity and said insert each have, respectively, a leading end and a trailing end, said insert opening intersecting said trailing end of said cavity.

5. The lure of claim 4 wherein the widths of said cavity and said insert increase from said leading end to said trailing end.

6. The lure of claim 5 wherein the walls of said cavity are straight when viewed in longitudinal cross section.

7. The lure of claim 4 wherein said lure body further has an access opening intersecting said leading end of said cavity, and said insert comprises a line eyelet generally adjacent said leading end and accessible through said access opening, and means for carrying at least one fish hook adjacent said trailing end and accessible through said insert opening.

8. The lure of claim 7 wherein said means for carrying said fish hook defines a hook eyelet.

9. The lure of claim 5 wherein the thickness of said insert is reduced in the areas of said eyelets.

10. The lure of claim 9 wherein the thickness of said insert is tapered adjacent the leading and trailing ends, decreasing outwardly.

11. The lure of claim 2 wherein said insert is comprised of a material having substantially greater density than the material of said lure body.

12. The lure of claim 11 wherein said insert is comprised of metal, and said lure body is comprised of plastic.

13. A fishing lure body having outer surfaces defining the general overall external size and configuration of a lure, said outer surfaces including an upper surface and a lower surface, said lure body having a cavity extending therethrough, said cavity having length extending in a generally horizontal direction generally along and through the longest dimension of said lure body, width extending transverse to said lengthwise direction and generally horizontally, and depth extending transverse to said lengthwise direction and generally vertically, the width of said cavity being greater than the depth over a major portion of the length of said cavity, the configuration of said cavity being dissimilar to said overall external configuration, and said body having an insert opening through the exterior thereof into one end of said cavity.

14. The device of claim 13 wherein said cavity has a leading end and a trailing end, said insert opening intersecting said trailing end, and said lure body further having an access opening intersecting the leading end of said cavity.

15. The device of claim 14 wherein the width of said cavity increases from said leading end to said trailing end.

16. The device of claim 15 wherein the walls of said cavity are straight when viewed in longitudinal cross section.

17. The device of claim 13 wherein said body is integrally molded of a plastic material.

* * * * *